Feb. 21, 1939.   N. MacKINNON   2,147,745
VEHICLE BUMPER
Filed Nov. 1, 1937
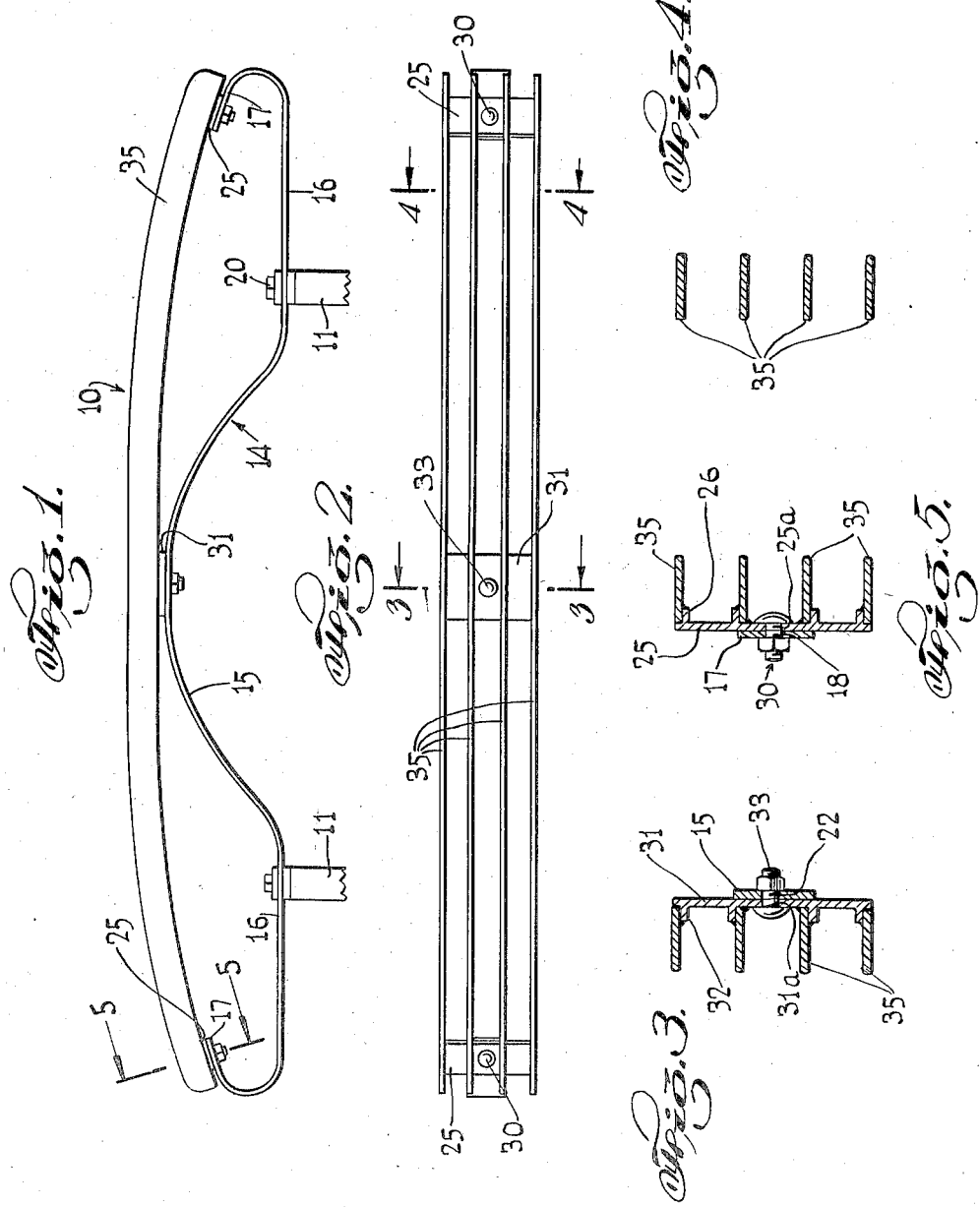
INVENTOR
NEIL MACKINNON
BY
Carl Miller
ATTORNEY Patented Feb. 21, 1939

2,147,745

UNITED STATES PATENT OFFICE 2,147,745

VEHICLE BUMPER

Neil MacKinnon, Newark, N. J.

Application November 1, 1937, Serial No. 172,199

2 Claims. (Cl. 293—55)

This invention relates to vehicle bumpers and is particularly directed to bumpers for an automobile.

It is well known that often when trying to park an automobile, the same strikes or pushes another automobile either at the front or at the rear causing the bumpers of the colliding automobiles to interlock, resulting in considerable difficulty to disengage the automobiles from one another. It is therefore an object of this invention to obviate this difficulty by providing a bumper for an automobile which is so constructed as not to lock with other automobile bumpers or parts in the event of a collision or when pushing another automobile.

Another object of this invention is to provide a neat, rugged and compact bumper that offers practically no wind resistance of the character described, which shall be inexpensive to manufacture, attractive in appearance, and yet practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is a top plan view of an automobile bumper embodying the invention;

Fig. 2 is a front elevational view thereof;

Fig. 3 is a cross-sectional view taken on line 3—3 of Fig. 2;

Fig. 4 is a cross-sectional view taken on line 4—4 of Fig. 2; and

Fig. 5 is a cross-sectional view taken on line 5—5 of Fig. 1.

Referring now in detail to the drawing, 10 designates a bumper embodying the invention for either the front or rear of an automobile, or other vehicle. The bumper 10 is fixed to the rear ends 11 of the vehicle frame; it comprises a rear support bar 14 of flat metal stock disposed in a horizontal plane, having a central curved portion 15, and aligned outwardly extending portions 16 at the opposite ends of its curved portion. Extending from the portions 16 of the bar 14 are forwardly and inwardly curved portions 17 constituting re-entrantly curved loops having openings 18. The portions 16 are fixed to the frame portions 11 by bolts 20, or in any other suitable manner. The curved portion 15 has a central opening 22.

Attached to the front faces of each of the portions 17 of the loops, is a vertical bar 25 formed with a plurality of forwardly extending parallel flanges 26 and having an opening 25a registering with the opening 18. As shown in the drawing, there are four flanges 26 on each bar 25, although any number of flanges may be provided. The top flange 26 is somewhat below the upper edge of the bar 25, whereas, the lower flange 26 is somewhat above the lower edge of the bar. The bars 25 may be attached to the loops 17 by bolts 30 passing through the registering openings 18, 25a.

Attached to the middle of the portion 15 of bar 14 is a bar 31, similar to bars 25, formed with an opening 31a registering with opening 22, and having short forwardly extending flanges 32 aligned with the flanges 26 of the bars 25. The bar 31 may be attached to portion 15 by a bolt 33 passing through the registering openings 22, 31a and an opening in said bar registering therewith.

It will be noted that the bar 31 is disposed forwardly of the bars 25. Interconnecting the bars 25 and 31 are a plurality of flat plates 35 disposed in horizontal planes. As shown in the drawing, there are four plates 35 attached to the four sets of flanges 26, 32. The upper plate 35 rests on the top flanges 26, 32 and may be fixed thereto by welding. The bottom plate 35 contacts the underside of the lowermost flanges 26, 32 and is likewise welded. The middle plates 35 may contact the bottom and top of the middle flanges 26, 32, respectively, being attached thereto by welding or in any other suitable manner. The plates 35 are curved throughout their lengths and aligned one above the other.

It will now be understood that should the bumper 10 strike another bumper, the horizontal plates 35 of the first bumper will not hookingly engage the other bumper, thus, causing interengagement or locking of the two cars.

It will thus be seen that there is provided a device in which the several objects of this invention are achieved, and which is well adapted to meet the conditions of practical use.

Having thus described my invention, I claim as new and desire to secure by Letters Patent:

1. A bumper comprising a support bar having a forwardly curved central portion and forwardly and inwardly bent end loops, a vertical bar rigid on the convex central portion of said support bar, a plurality of vertical bars rigid on said loops, all of said vertical bars having spaced lugs on their outer faces, and a plurality of curved flat plates welded to said vertical bars and lugs in parallel, horizontal planes, the edges of said plates extending outwardly to form continuous unbroken surfaces.

2. A bumper comprising a support bar having a central forwardly curved portion and re-entrantly curved loops at their ends, a vertical bar bolted to the middle of said support bar on its forward side, a pair of vertical bars bolted to the front elements of said loops, said vertical bars having spaced integral forwardly extending aligned parallel flanges, and a plurality of wide horizontal plates welded to said flanges and disposed in parallel planes, said plates bowed edgewise throughout their lengths and extending in advance of said bars.

NEIL MacKINNON.